United States Patent
Miyahara et al.

(10) Patent No.: US 11,256,969 B1
(45) Date of Patent: Feb. 22, 2022

(54) IMAGE FORMING APPARATUS, IMAGE PROCESSING METHOD, AND IMAGE FORMING METHOD FOR SPEEDING UP AUTO COLOR MODE BY MONOCHROME THRESHOLD VALUE

(71) Applicant: KYOCERA Document Solutions Inc., Osaka (JP)

(72) Inventors: Norifumi Miyahara, Torrance, CA (US); Kunihiko Shimamoto, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/163,464

(22) Filed: Jan. 31, 2021

(51) Int. Cl.
G06K 15/02 (2006.01)
G06F 3/12 (2006.01)
H04N 1/60 (2006.01)
H04N 1/40 (2006.01)

(52) U.S. Cl.
CPC ....... *G06K 15/1878* (2013.01); *G06F 3/1229* (2013.01); *G06K 15/1802* (2013.01); *H04N 1/40062* (2013.01); *H04N 1/6072* (2013.01); *G06F 3/1208* (2013.01)

(58) Field of Classification Search
None
See application file for complete search history.

(56) References Cited

U.S. PATENT DOCUMENTS

| 2008/0062483 A1* | 3/2008 | Morimoto ............. H04N 1/56 358/530 |
| 2009/0073516 A1* | 3/2009 | Tanaka ............. H04N 1/46 358/505 |

FOREIGN PATENT DOCUMENTS

JP     2010-004271 A     1/2010

* cited by examiner

*Primary Examiner* — Scott A Rogers
(74) *Attorney, Agent, or Firm* — Hawaii Patent Services; Nathaniel K. Fedde; Kenton N. Fedde

(57) ABSTRACT

Provided is an image forming apparatus that speeds up the performance in the auto color mode. A document reading unit reads a document and outputs image data. A document determination unit temporarily determines the document as a monochrome document when the ratio of the color components of the document is equal to or less than the monochrome threshold value at a specific timing after the document reading unit starts reading the document. An image processing unit performs monochrome image processing on the image data. A document determination unit determines that the document is a color document when the ratio of the color components of the image data is equal to or more than the color threshold value while the image processing for the monochrome document is being performed.

15 Claims, 4 Drawing Sheets

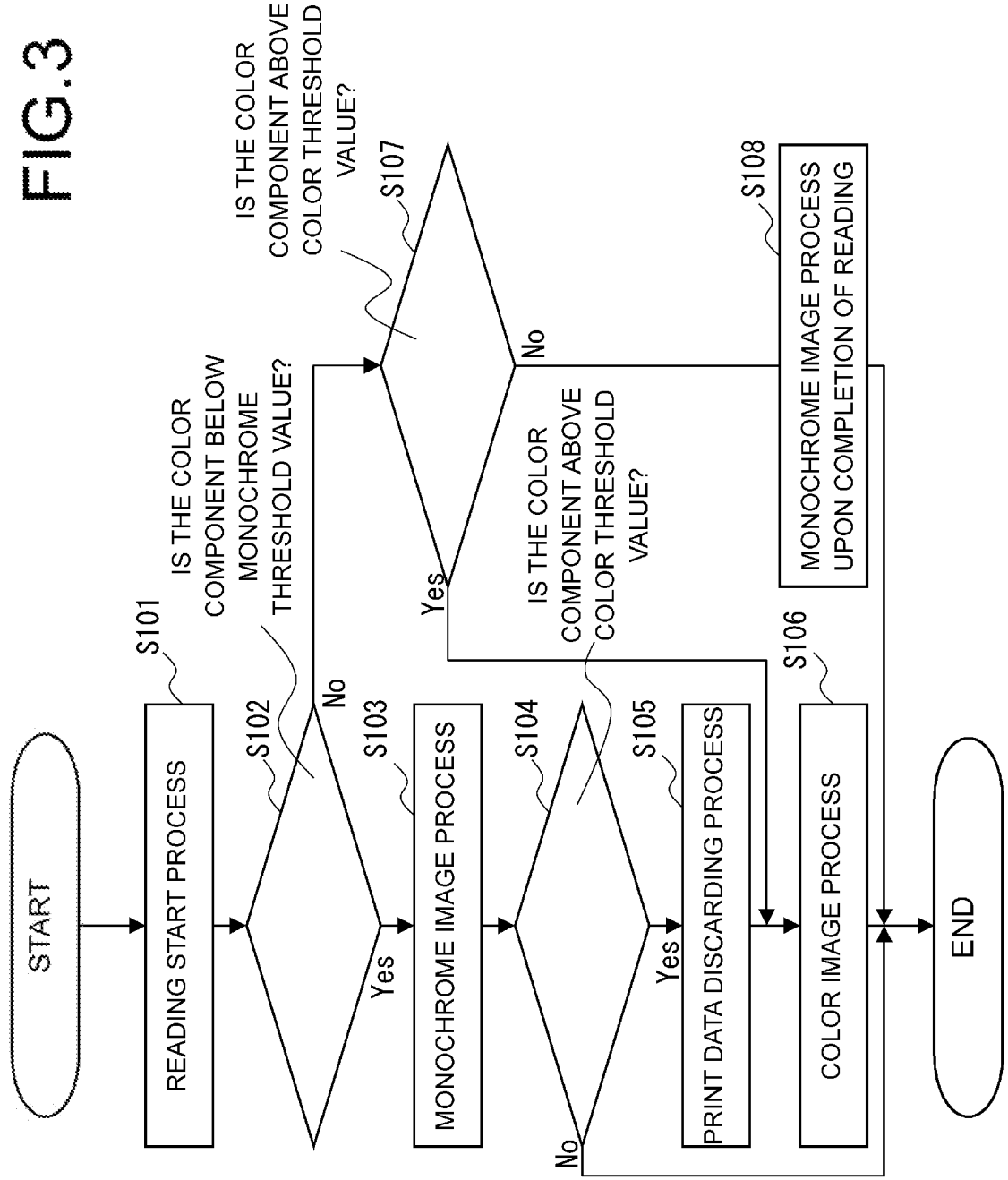

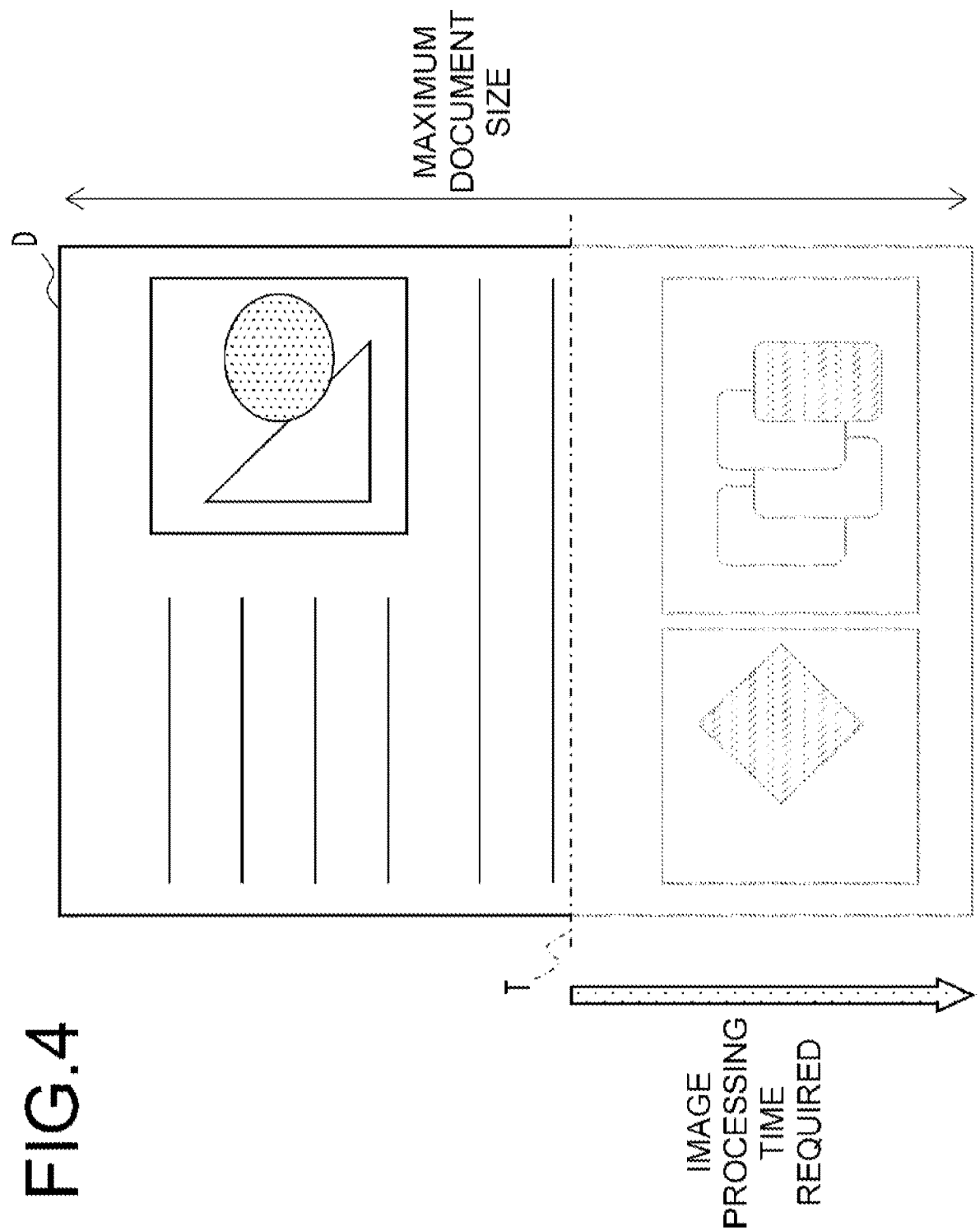

IMAGE FORMING APPARATUS, IMAGE PROCESSING METHOD, AND IMAGE FORMING METHOD FOR SPEEDING UP AUTO COLOR MODE BY MONOCHROME THRESHOLD VALUE

BACKGROUND

The present disclosure relates to an image forming apparatus, an image processing method, and an image forming method, and more particularly to an image forming apparatus, an image processing method, and an image forming method that speed up an auto color mode.

There is an image forming apparatus such as a multi-functional peripheral (MFP) capable of printing a document or an image.

Some of the image forming apparatuses are capable of selecting any one of a color mode, a monochrome mode, and an auto color mode when copying, or the like.

Among them, the color mode is a mode that a document is read in color, and color output is performed. The monochrome mode is a mode that monochrome output is performed regardless of whether the document is monochrome or color. The auto color mode is a mode that the document is determined whether color or monochrome, and the color or monochrome output is performed according to the determination.

There is a typical image forming apparatus capable of selecting the auto color mode. In this apparatus, when a specific threshold value is set and the number of color pixels of the original document exceeds the threshold value while the original document is being read, image processing is started in the color mode. As a result, even in the auto color mode, image processing can be started without waiting for the completion of reading the document.

SUMMARY

An image forming apparatus according to an embodiment of the present disclosure is an image forming apparatus having a document reading unit configured to read a document and outputs image data and is capable of determining whether the document is a color document or a monochrome document, including: an document determination unit configured to temporarily determine the document as a monochrome document when the ratio of color components of the document is equal to or less than a monochrome threshold value at a specific timing after the document reading unit starts reading the document; an image processing unit configured to execute monochrome image processing for a monochrome document on the image data when the document is temporarily determined to be a monochrome document by the document determination unit; wherein the document determination unit, when the ratio of the color components of the image data becomes equal to or more than the color threshold value while the image processing unit is performing the image processing for the monochrome document, determines the document as a color document and causes the image processing unit to execute color image processing for the color document.

An image processing method according to an embodiment of the present disclosure is an image processing method executed by an image processing apparatus having a document reading unit configured to read a document and outputs image data and is capable of determining whether the document is a color document or a monochrome document, the image processing method including the steps of: temporarily determining the document as a monochrome document when the ratio of color components of the document is equal to or less than a monochrome threshold value at a specific timing after starting reading the document; executing monochrome image processing for a monochrome document on the image data when the document is temporarily determined to be a monochrome document; and determining, when the ratio of the color components of the image data becomes equal to or more than the color threshold value while performing the image processing for the monochrome document, the document as a color document and executing color image processing for the color document.

An image forming method according to an embodiment of the present disclosure is an image forming method executed by an image forming apparatus having a document reading unit configured to read a document and outputs image data and is capable of determining whether the document is a color document or a monochrome document, the image forming method including the steps of: temporarily determining the document as a monochrome document when the ratio of color components of the document is equal to or less than a monochrome threshold value at a specific timing after starting reading the document; executing monochrome image processing for a monochrome document on the image data when the document is temporarily determined to be a monochrome document; and determining, when the ratio of the color components of the image data becomes equal to or more than the color threshold value while performing the image processing for the monochrome document, the document as a color document and executing color image processing for the color document.

Hereinafter, in the present embodiment, a "component" of the color component and the monochrome component indicates a pixel. That is, an example is described in which the color component is the number of color pixels and the monochrome component is the number of monochrome pixels.

BRIEF DESCRIPTION OF THE FIGURE

FIG. 3 is a flowchart of the auto color mode process according to the embodiment of the present disclosure; and FIG. 4 is a conceptual diagram of the auto color mode process as shown in FIG. 3.

DETAILED DESCRIPTION

Embodiment

[System Configuration of Image Forming Apparatus 1]

The image forming apparatus 1 of the present embodiment is an image forming apparatus having an auto color mode that can discriminate whether a document is a color document or a monochrome document.

Figure 1:
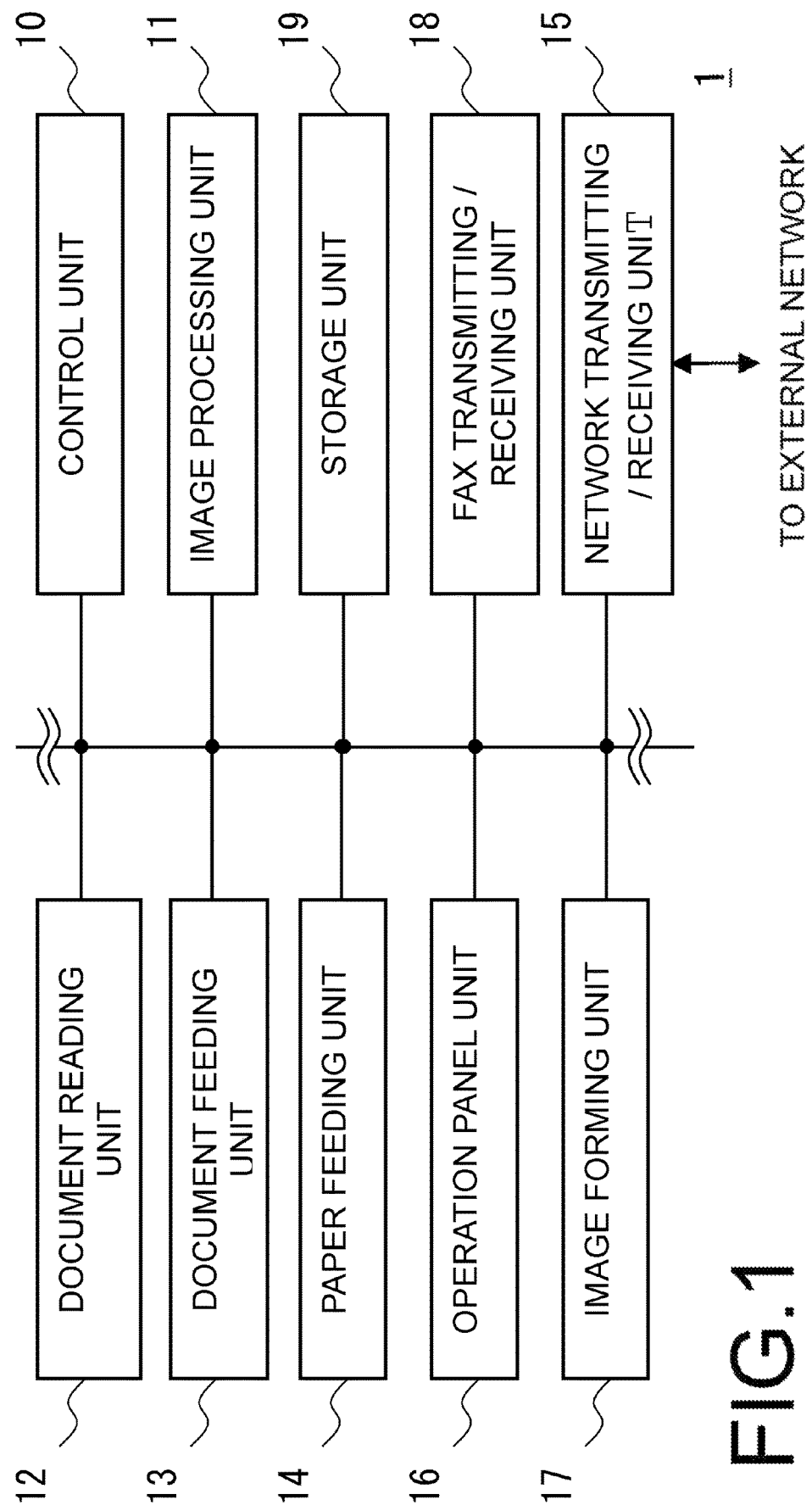
FIG. 1 is a block diagram showing a system configuration of an image forming apparatus according to an embodiment of the present disclosure.

At first, the system configuration of the image forming apparatus 1 is described with reference to FIG. 1.

The image forming apparatus 1 includes a control unit 10, an image processing unit 11, a document reading unit 12, a document feeding unit 13, a paper feeding unit 14, a network transmitting/receiving unit 15, an operation panel unit 16, an image forming unit 17, and a FAX transmitting/receiving unit 18, a storage unit 19, or the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, processor for specific purpose), or the like.

The control unit 10 reads a control program stored in the ROM or the HDD of the storage unit 19, expands it into the RAM, executes the control program, and operates as each unit of a functional block as described later. Further, the control unit 10 controls the entire apparatus according to instruction information input from an external terminal or the operation panel unit 16.

The image processing unit 11 is a control calculation unit such as a DSP (Digital Signal Processor), a GPU (Graphics Processing Unit), an ASIC, or the like. The image processing unit 11 performs image processing on the image data 200 (FIG. 2) read by the document reading unit 12, acquired from an external terminal, stored in a storage folder, or received by the FAX transmitting/receiving unit 18. This image processing may be processing such as enlargement/reduction, density adjustment, gradation adjustment, image improvement, or the like.

Further, the image processing unit 11 stores the processed image data 200 in the storage unit 19 as print data 230. At this time, the image processing unit 11 can also convert the image data 200 that is RGB (Red Green Blue) color into a CMYK (Cyan Magenta Yellow blacK) color, a monochrome, a single color by color space conversion, or the like. As described later, the print data 230 may be band data used for image formation.

The image processing unit 11 can also convert, for example, the image data 200 or the print data 230 (FIG. 2) into an electronic document such as PDF, or the like, or a file of image data such as TIFF, or the like. Further, the image processing unit 11 may be capable of executing at least a part of OCR (Optical Character Recognition) processing.

The document reading unit 12 reads the set document and outputs the image data 200. Further, the document reading unit 12 is arranged above the main body of the image forming apparatus 1.

Figure 2:
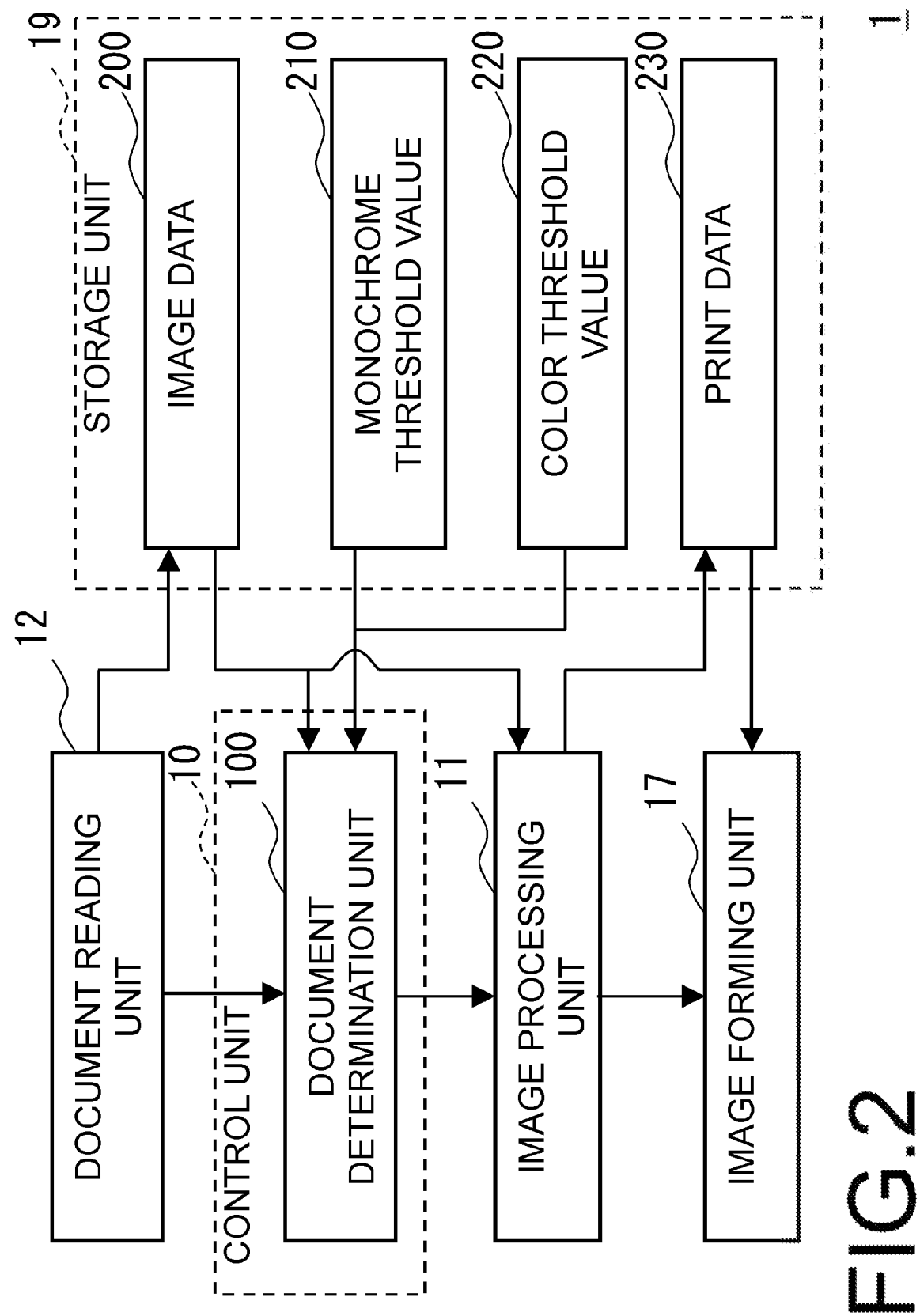
FIG. 2 is a block diagram showing a functional configuration of the image forming apparatus according to an embodiment of the present disclosure.

The document reading unit 12 includes a scanner, a platen glass, and a document reading slit. When reading a document placed on the platen glass, the document reading unit 12 moves the scanner to a position facing the platen glass and reads the document placed on the platen glass while scanning to read the image data 200 (FIG. 2). The document reading unit 12 stores the acquired image data 200 in the storage unit 19.

Further, the document reading unit 12 moves the scanner to a position facing the document reading slit when reading the document fed from the document feeding unit 13. Then, the document reading unit 12 reads the document through the document reading slit in synchronization with the document feeding operation by the document feeding unit 13 and acquires the image data 200. The document reading unit 12 stores the acquired image data 200 in the storage unit 19 as the image data 200.

The document feeding unit 13 conveys a document read by the document reading unit 12. The document feeding unit 13 is arranged above the document reading unit 12.

The document feeding unit 13 includes a document placing unit and a document transport mechanism. The document feeding unit 13 sequentially feeds out the documents placed on the document placing unit one by one by the document feeding mechanism, and it feeds them to the document reading unit 12.

The paper feeding unit 14 feeds the recording paper one by one toward the image forming unit 17. The paper feeding unit 14 is provided in the main body.

The network transmitting/receiving unit 15 is a network connecting unit including a LAN board for connecting to an external network, a wireless transceiver, and the like. The external network in the present embodiment is, for example, a LAN, a wireless LAN, a WAN, a mobile telephone network, a voice telephone network, or the like.

The network transmitting/receiving unit 15 transmits/receives data via a data communication line and transmits/receives a voice signal via a voice telephone line.

The operation panel unit 16 includes an input unit such as a button, a touch panel, and the like, and a display unit such as an LCD (Liquid Crystal Display), an organic EL display, and the like. The operation panel unit 16 is arranged on the front side of the image forming apparatus 1.

The buttons on the input unit of the operation panel unit 16 are buttons of a numeric pad, a start, a cancel, a switching operation mode, an issuing command button for executing a job, or the like. The operation mode may include a mode such as copying, fax transmission, scanner, network scanner, and the like. Further, the job includes printing, transmitting, saving, recording, or the like, for the selected document. The input unit of the operation panel unit 16 acquires various job instructions of the image forming apparatus 1 from the user. Moreover, according to the user's instruction acquired from the operation panel unit 16, inputting and changing the information of each user is also possible.

In the present embodiment, the operation panel unit 16 can specify the document size such as A4, A3, and Letter when copying. For example, this designated document size may be the maximum document size of the embodiment. Alternatively, the maximum size of the document that can be actually read by the document reading unit 12 may be the maximum document size.

The image forming unit 17 forms an image of the print data 230 on a recording paper according to an output instruction from the user.

The image forming unit 17 includes a photosensitive drum, an exposure unit, a developing unit, a transfer unit, a fixing unit, and the like. The image forming unit 17 records a toner image on a recording paper by executing an image forming process including charging, exposure, development, transfer, and fixing.

In the present embodiment, the image forming unit 17 can form a color or monochrome image from the print data 230 (FIG. 2).

The FAX transmitting/receiving unit 18 transmits/receives a facsimile. The FAX transmitting/receiving unit 18 can receive a facsimile from another FAX apparatus via a voice line, save the received image data 200 in the storage unit 19, and cause the image forming unit 17 to form an image. Further, the FAX transmitting/receiving unit 18 can convert a document read by the document reading unit 12 or network FAX data transmitted from an external terminal into print data 230, and it can transmit the print data 230 to another FAX apparatus by a facsimile via a voice line.

The storage unit 19 is a non-transitory recording medium such as a semiconductor memory, which is a ROM (Read Only Memory) or a RAM (Random Access Memory), or the like, or an HDD (Hard Disk Drive), or the like.

The RAM of the storage unit 19 may hold the stored contents by a function such as self-refreshing, or the like, even in the power saving state.

A control program for controlling the operation of the image forming apparatus 1 is stored in the ROM or the HDD of the storage unit 19. In addition to this, the storage unit 19 also stores user account settings. Further, the storage unit 19 may include a storage folder area for each user.

In the image forming apparatus 1, the control unit 10 and the image processing unit 11 may be integrally formed, such as a CPU with a GPU, a chip-on-module package, an SOC (System On a Chip), or the like.

In addition, the control unit 10 and the image processing unit 11 may include a recording medium such as a RAM, a ROM, a flash memory, or the like.

[Functional Configuration of Image Forming Apparatus 1]

Here, the functional configuration of the image forming apparatus 1 is described with reference to FIG. 2.

The control unit 10 of the image forming apparatus 1 includes a document determination unit 100.

The storage unit 19 stores image data 200, a monochrome threshold value 210, a color threshold value 220, and print data 230.

The document determination unit 100 determines whether the document is a color document or a monochrome document.

Specifically, the document determination unit 100 temporarily determines that the document is a monochrome document when the ratio of the color components of the document is equal to or less than the monochrome threshold value 210 at a specific timing after the document reading unit 12 starts reading the document. Hereinafter, in the present embodiment, the a "component" of the color component and the monochrome component indicates a pixel. That is, an example is described in which the color component is the number of color pixels and the monochrome component is the number of monochrome pixels. When determining the ratio of color components for the monochrome threshold value 210, the document determination unit 100 determines the ratio of color pixels in the image data 200 at a specific timing. When it is determined that the document is a monochrome document, the document determination unit 100 causes the image processing unit 11 to execute monochrome image processing for a monochrome document. In the present embodiment, the specific timing may be a timing at which the monochrome image processing can be completed at the time when the reading of the document is completed. The time when this reading is completed is, for example, the time when the document is read at the maximum document size.

Here, when the ratio of the color components of the image data 200 becomes the color threshold value 220 or more while the image processing unit 11 is performing the image processing for the monochrome document, the document determination unit 100 determines the document as a color document. When determining the ratio of color components with respect to the color threshold value 220, the document determination unit 100 determines the ratio of color pixels in the image data 200 to the maximum document size of the document. Then, when document determination unit 100 determines that the document is a color document, the document determination unit 100 causes the image processing unit 11 to execute color image processing for the color document.

In the present embodiment, the image processing unit 11 executes image processing for monochrome documents or image processing for color documents, and outputs the print data 230 to the storage unit 19.

At this time, when the document determination unit 100 temporarily determines that the document is a monochrome document, the image processing unit 11 executes monochrome image processing for a monochrome document on the image data 200. Here, in the present embodiment, an example is described that the document configured of white or background color with black or a single color is a monochrome document.

Otherwise, when the document determination unit 100 determines that the document is a color document, the image processing unit 11 performs color image processing for the color document on the image data 200. At this time, if the monochrome image processing has already been performed, the print data 230 at that point may be discarded.

Here, in the present embodiment, the image processing unit 11 can execute the monochrome image processing and the color image processing faster than the reading time of the document by the document reading unit 12.

The image data 200 is data of an image of a document placed on the document placement unit and read by the document reading unit 12 according to the instruction from the operation panel unit 16. The image data 200 may be, for example, bitmap image data of R (Red), G (Green), B (Blue), and each color is 8 bits, 16 bits, or the like, for each page, where PDL (Page Description Language) data is rendered by the control unit 10.

The monochrome threshold value 210 is a threshold value for determining whether the document is a monochrome document or not. In the present embodiment, the monochrome threshold value 210 is set as a threshold value of the ratio of the color component of the area, which has already read, in the image data 200. This ratio may be, for example, about 0.01 percent to a couple of percent.

The color threshold value 220 is a threshold for determining whether or not the document is a color document. In the present embodiment, the color threshold value 220 is set as a threshold value of a ratio obtained by dividing the value of the color component of the area, which has already read, in the image data 200 by the number of pixels of the maximum document size. This ratio may be, for example, about 0.01 to a couple of percent.

The print data 230 is output data generated from the image data 200. In the present embodiment, the print data 230 is a set of band data generated by color space conversion, or the like, by the image processing unit 11 for each page. The band data is a block of data and becomes original data used for forming an electrostatic latent image on the photosensitive drum of each color when the image is formed by the image forming unit 17. For example, when outputting in monochrome, the band data is monochrome bitmap data. When output in color, the band data is bitmap data of each color of CMYK.

Here, in the present embodiment, the monochrome threshold value 210 and the color threshold value 220 may be set to the same value. However, as described above, the monochrome threshold value 210 is determined by the ratio at the specific timing. On the other hand, the color threshold value 220 is determined by the ratio to the maximum document size. Therefore, as described later, different determination for color or monochrome may be made.

In addition, the specific timing, the color threshold value 220, and the monochrome threshold value 210 can be set according to the size of the document and the environment, or the like.

Here, the control unit 10 of the image forming apparatus 1 is caused to function as the document determination unit 100 by executing the control program stored in the storage unit 19. Further, each unit of the image forming apparatus 1 described above becomes a hardware resource that executes the image forming method of the present disclosure.

In addition, a part or an arbitrary combination of the above-described functional configurations may be configured by an IC, a programmable logic, an FPGA (Field-Programmable Gate Array), or the like, in terms of hardware or a circuit. Further, the function of the document determination unit 100 can be executed by the image processing unit 11, or at least part of the image processing executed by the image processing unit 11 can be executed by the control unit 10.

[Auto Color Mode Process by Image Forming Apparatus 1]

Next, with reference to FIGS. 3 to 4, the auto color mode process by the image forming apparatus 1 according to the embodiment of the present disclosure is described.

In the automatic color mode process of the present embodiment, at the specific timing after starting reading the document, if the ratio of the color components of the document is equal to a monochrome threshold value 210 or less, the document is temporarily determined as a monochrome document. Then, if the document is temporarily determined to be the monochrome document, the monochrome image processing for the monochrome document is performed on the image data 200. Further, while the image processing for a monochrome document is being performed, if the ratio of the color component of the image data 200 is equal to or greater than the color threshold value 220, the document is determined to be a color document, and color image processing for the color document is executed.

In the auto color mode process of the present embodiment, the control unit 10 and the image processing unit 11 mainly execute the programs stored in the storage unit 19 by using the hardware resources in cooperation with the respective units.

Hereinafter, the details of the auto color mode process is described step by step with reference to the flowchart of FIG. 3.

(Step S101)

At first, the document determination unit 100 performs a reading start process.

In the present embodiment, the user places a monochrome document or a color document on the document placement unit, selects the auto color mode on the operation panel unit 16, and instruct to copy, or the like.

Then, the document determination unit 100 acquires this instruction and causes the document reading unit 12 to start reading the placed document.

Further, in addition to copying, transmission, document box storage, facsimile transmission, or the like, can be selected as instruction to the document.

(Step S102)

Next, the document determination unit 100 determines whether the color component is less than or equal to the monochrome threshold value 210.

Here, the document determination unit 100 calculates the ratio of the color components in the image data 200 acquired up to that point at the specific timing after the document reading unit 12 starts reading the document.

As refer to FIG. 4, the relationship between the specific timing and the ratio of the color components is described.

FIG. 4 shows an example in which the ratio of the color components in the image data 200 is calculated at a specific timing T until the maximum document size is read when the document is read by the document reading unit 12 from the upper side to the lower side. In the present embodiment, for example, the image processing unit 11 can execute color image processing and monochrome image processing much faster than the reading of the document by the document reading unit 12. Therefore, for example, the specific timing T is set to a timing at which the monochrome image processing can be completed when the reading of the document is completed. In FIG. 4, the time required for this monochrome image processing is indicated by a thick arrow.

More specifically, if it is determined whether or not the document is a monochrome document before the specific timing T, the process of the image processing unit 11 precedes. Therefore, the image processing unit 11 waits for the input of the image data 200 by the document reading unit 12 from the middle. Further, in this case, whether or not the document is a monochrome document is determined at an early timing, and therefore, depending on the setting of the monochrome threshold value 210, the possibility that the document is a color document later is increased.

On the contrary, if it is determined after the specific timing T whether the document is a monochrome document, the image processing by the image processing unit 11 continues even after the document reading by the document reading unit 12 is completed. Therefore, subsequent processing such as image formation is delayed. Further, in this case, whether or not the document is a monochrome document is determined at a later timing, and therefore, depending on the setting of the monochrome threshold value 210, the possibility that the document is already a color document is increased.

On the other hand, if the timing at which the monochrome image processing for one page is just completed at the time of completing the reading of one page is set as the specific timing T, waiting until the determination of a color document or a monochrome document at the last moment is possible. Therefore, the possibility of erroneous determination as a color document can be reduced. Furthermore, the delay due to continuing the subsequent image processing can be eliminated. As a result, performance of copying, or the like, can be improved.

More specifically, the document determination unit 100 determines, for each pixel of the image data 200 in the read range, whether it is a color, or black and white or a single color. At this time, the document determination unit 100 calculates, for example, the average and difference values of the RGB components for the pixel. Then, the document determination unit 100 may determine to be color when the value exceeds a value indicated by a specific linear expression, or the like, which is set the range of error values to the average. Then, the document determination unit 100 divides the number of pixels determined to be color by the number of pixels in the read range and calculates the ratio of color pixels in the image data 200, or the like. Then, the document determination unit 100 determines whether or not the calculated ratio of the color components is equal to or less than the monochrome threshold value 210.

If the calculated color component ratio of the document is equal to or less than the monochrome threshold value 210, the document determination unit 100 temporarily determines the document as a monochrome document, and the determination is Yes. If the ratio of the color components exceeds the monochrome threshold value 210, the document determination unit 100 determines that the document has a possibility to be a monochrome document but a color document, and the determination is No.

In the case of Yes, the document determination unit 100 advances the process to step S103.

In the case of No, the document determination unit 100 advances the process to step S107.

(Step S103)

If the color component is equal to or less than the monochrome threshold value 210, the document determination unit 100 and the image processing unit 11 perform monochrome image process.

The document determination unit 100 temporarily determines that the document is a monochrome document. Then, the document determination unit 100 causes the image processing unit 11 to perform monochrome image processing for a monochrome document on the image data 200. As a result, the image processing unit 11 generates monochrome print data 230 from the image data 200.

(Step S104)

Next, the document determination unit 100 determines whether the color component is equal to or greater than the color threshold value 220 or not.

The document determination unit 100 continues to calculate the number of color pixels in the image data 200 while the image processing unit 11 is performing image processing for a monochrome document. The calculation of the number of color pixels can be executed by the same method as in step S102 as described above. Then, the document determination unit 100 calculates the ratio of the calculated color pixels to the maximum document size of the document. That is, the document determination unit 100 calculates the ratio of color components by dividing the calculated number of color pixels by the number of pixels of the maximum document size of the document, or the like. Then, if the ratio of the color components calculated here is equal to or more than the color threshold value 220, the document determination unit 100 determines that the document is a color document, and the determination is Yes. In other cases, the document determination unit 100 determines No.

In the case of Yes, the document determination unit 100 advances the process to step S105.

In the case of No, the document determination unit 100 causes the image processing unit 11 to continue the monochrome image processing. That is, the document determination unit 100 settles that the document is a monochrome document. Then, the document determination unit 100 ends the auto color mode process.

(Step S105)

If the color component is equal to or greater than the color threshold value 220, the document determination unit 100 performs the print data discarding process.

The document determination unit 100 causes the image processing unit 11 to discard the print data 230 being generated and restore the storage capacity.

The document determination unit 100 then advances the process to step S107.

(Step S106)

Here, the document determination unit 100 and the image processing unit 11 perform color image process.

The document determination unit 100 causes the image processing unit 11 to perform color image processing for a color document on the image data 200.

As a result, the image processing unit 11 generates the color print data 230 including the band data having each of CMYK colors.

Then, the document determination unit 100 ends the auto color mode process.

(Step S107)

Next, the document determination unit 100 determines whether the color component is equal to or greater than the color threshold value 220 or not. This process is performed similarly to step S104. The document determination unit 100 determines Yes if the color component is equal to the color threshold value 220 or more. The document determination unit 100 determines No if the color component is less than the color threshold value 220.

In the case of Yes, the document determination unit 100 returns the process to step S106.

In the case of No, the document determination unit 100 advances the process to step S108.

(Step S108)

If the color component is less than the color threshold value 220, the document determination unit 100 and the image processing unit 11 perform monochrome image process upon completion of reading.

This is the case when the ratio of the color components in the image data 200 exceeds the monochrome threshold value 210 at the specific timing of reading the image data 200, however, this corresponds to the case if it is determined that the document is a monochrome document considering the maximum document size. In this case, the document determination unit 100 performs monochrome image processing when the document reading is completed. In the present embodiment, since the color threshold value 220 and the monochrome threshold value 210 are set to the same value, this is a situation that may occur only in rare.

With the above, the auto color mode process according to the embodiment of the present disclosure is completed.

After that, the color or monochrome print data 230 generated in the storage unit 19 is image-formed by the image forming unit 17 and is output on the recording paper.

Alternatively, the document determination unit 100 and the image processing unit 11 may send the print data 230 as electronic document data by electronic mail, messenger, FTP (File Transfer Protocol), or the like, or store the print data 230 in the document box of the storage unit 19. Alternatively, the FAX transmitting/receiving unit 18 may transmit the print data 230 by facsimile.

With the above configuration, the following effects can be obtained.

In a typical technology, in the auto color mode, whether color or monochrome is not possible to determine unless all part of the document is scanned due to its characteristics. For this reason, the image processing is started after the reading of the document, and in particular, the performance such as printing cannot be improved.

Thus, in a typical technology, a color threshold value is set, and if the color component of the document exceeds the threshold value while the document is being read, image processing is started in the color mode.

However, in the case of a monochrome document, the color threshold value is not exceeded, so the start of image processing is waited until the document reading is completed, and the performance cannot be improved.

On the other hand, the image forming apparatus 1 according to the present embodiment is an image forming apparatus having a document reading unit 12 configured to read a document and outputs image data 200 and is capable of to determine whether the document is a color document or a monochrome document, including: an document determination unit 100 that temporarily determines the document as a monochrome document when the ratio of the color components of the document is equal to or less than a monochrome threshold value 210 at a specific timing after the document reading unit 12 starts reading the document; an image processing unit 11 that executes monochrome image processing for a monochrome document on the image data 200 when the document is temporarily determined to be a monochrome document by the document determination unit 100; wherein the document determination unit 100, when the ratio of the color components of the image data 200 becomes equal to or more than the color threshold value 220 while the image processing unit 11 is performing the image processing for the monochrome document, determines the document as a color document and causes the image processing unit 11 to execute color image processing for the color document.

With this configuration, in the auto color mode, image processing can be started even for monochrome documents without waiting for the completion of document scanning, and the output speed can be increased. That is, the performance can be improved even in the case of a monochrome document in the auto color mode. Therefore, in the auto color mode, while surely determining the color document or the monochrome document, copying, or the like, with a more comfortable performance can be performed.

Specifically, even if the color component of the document exceeds the color threshold value 220 after the monochrome image processing is started, the data processed monochrome image processing can be discarded, and the color image processing can be started. That is, since the monochrome image processing is speculatively executed, the timing of starting the color image processing does not change, and the performance does not deteriorate even when the document is color. On the other hand, if the document is a monochrome document, performance can be improved because of being speculatively executed.

Further, in the image forming apparatus 1 according to the embodiment of the present disclosure, the image processing unit 11 can execute the monochrome image processing earlier than the reading of the document by the document reading unit 12, and the specific timing is a timing at which the monochrome image processing is capable of being completed at the time that reading of the document is completed.

In this way, by configuring the above-described monochrome threshold value 210 and the specific timing to be adjusted, the performance can be improved for almost all the documents.

Further, in the image forming apparatus 1 according to the embodiment of the present disclosure, the document determination unit 100, when determining the ratio of the color component with respect to the monochrome threshold value 210, determines the ratio of color pixels in the image data 200 at the specific timing.

With this configuration, quickly estimating the document is a monochrome document at a specific timing is possible. Therefore, the possibility of improving the performance can be increased.

Further, in the image forming apparatus 1 according to the embodiment of the present disclosure, the document determination unit 100, when determining the ratio of the color component with respect to the color threshold value 220, determines the ratio of color pixels in the image data 200 to the maximum document size of the document.

With this configuration, for the color threshold value 220, a color document can be determined with a more accurate value. Therefore, the possibility that each document is erroneously determined to be color or black and white can be reduced, and the determination in the auto color mode is surely possible.

Further, in the image forming apparatus 1 according to the embodiment of the present disclosure, the monochrome threshold value 210 and the color threshold value 220 are set to the same value.

With this configuration, while being able to reliably determine a color document or a monochrome document in the auto color mode, the better performance can be attained.

Other Embodiments

In addition, the embodiment of the present disclosure describes an example in which the color threshold value 220 and the monochrome threshold value 210 have the same value, but different values may be used. In this case, the monochrome threshold value 210 is set to a value larger than the color threshold value 220. As a result, the possibility that the small number of pixels is determined to be monochrome at the specific timing can be increased. Further, the monochrome image processing can be surely executed first.

Alternatively, by setting the monochrome threshold value 210 to a value smaller than the color threshold value 220, the possibility of erroneous determination can be reduced, and the processing load can also be reduced.

In addition, if the ratio of color components exceeds the monochrome threshold value 210 and is less than the color threshold value 220 at the specific timing, monochrome image processing may be executed.

With such a configuration, more surely performing the monochrome image processing on the monochrome document in advance can be performed, and the performance can be improved.

Furthermore, the color threshold value 220 and the monochrome threshold value 210 may be variable. In this case, it may be changeable depending on the state of the document. Furthermore, the degree of change of the color threshold value 220 and the monochrome threshold value 210 may change according to the maximum document size.

With this configuration, in various configurations, the possibility to improve the performance can be increased.

In the above-described embodiment, the example in which the point at which the monochrome image processing can be completed when the reading of the document is completed is set as the specific timing has been described. At this time, it is described that the specific timing is a time when the monochrome image processing with the maximum document size can be completed.

However, the specific timing does not necessarily have to be set at the time of completion of the maximum document size. For example, the time before this can be set.

With this configuration, the performance can be improved even when a document smaller than the maximum document size is read.

In the above-described embodiment, the example of setting the specific timing for monochrome image processing has been described.

However, as another specific timing, the timing at which the color image processing is completed is set by the color threshold value 220, and the color image processing can also be speculatively executed simultaneously with the monochrome image processing.

With this configuration, it is possible to further improve the performance of color documents.

The present disclosure can also be applied to information processing apparatuses other than the image forming apparatus. That is, the configuration may be such that a network scanner, a server to which the scanner is separately connected by USB, or the like, is used.

Further, it goes without saying that the configurations and operations of the above-described embodiments are examples and can be appropriately modified and executed without departing from the aim of the present disclosure.

What is claimed is:

1. An image forming apparatus having a document reading unit configured to read a document and outputs image data and is capable of determining whether the document is a color document or a monochrome document, comprising:
   a document determination unit configured to temporarily determine the document as a monochrome document when the ratio of color components of the document is equal to or less than a monochrome threshold value at a specific timing after the document reading unit starts reading the document;
   an image processing unit configured to execute monochrome image processing for a monochrome document on the image data when the document is temporarily determined to be a monochrome document by the document determination unit; wherein
   the document determination unit,
   when the ratio of the color components of the image data becomes equal to or more than the color threshold value while the image processing unit is performing the image processing for the monochrome document, determines the document as a color document and causes the image processing unit to execute color image processing for the color document.

2. The image forming apparatus according to claim 1, wherein:
   the image processing unit is capable of executing the monochrome image processing earlier than the reading of the document by the document reading unit, and
   the specific timing is a timing at which the monochrome image processing is capable of being completed at the time that reading of the document is completed.

3. The image forming apparatus according to claim 1, wherein:
   the document determination unit,
   when determining the ratio of the color component with respect to the monochrome threshold value, determines the ratio of color pixels in the image data at the specific timing.

4. The image forming apparatus according to claim 1, wherein:
   the document determination unit,
   when determining the ratio of the color component with respect to the color threshold value, determines the ratio of color pixels in the image data to the maximum document size of the document.

5. The image forming apparatus according to claim 1, wherein:
   the monochrome threshold value and the color threshold value are set to the same value.

6. An image processing method executed by an image processing apparatus having a document reading unit configured to read a document and outputs image data and is capable of determining whether the document is a color document or a monochrome document, the image processing method comprising the steps of:
   temporarily determining the document as a monochrome document when the ratio of color components of the document is equal to or less than a monochrome threshold value at a specific timing after starting reading the document;
   executing monochrome image processing for a monochrome document on the image data when the document is temporarily determined to be a monochrome document; and
   determining, when the ratio of the color components of the image data becomes equal to or more than the color threshold value while performing the image processing for the monochrome document, the document as a color document and executing color image processing for the color document.

7. The image processing method according to claim 6, wherein:
   the method further comprises a step of executing the monochrome image processing earlier than the reading of the document, and
   the specific timing is a timing at which the monochrome image processing is capable of being completed at the time that reading of the document is completed.

8. The image processing method according to claim 6, wherein:
   determining, when determining the ratio of the color component with respect to the monochrome threshold value, the ratio of color pixels in the image data at the specific timing.

9. The image processing method according to claim 6, wherein:
   determining, when determining the ratio of the color component with respect to the color threshold value, the ratio of color pixels in the image data to the maximum document size of the document.

10. The image processing method according to claim 6, wherein:
    the monochrome threshold value and the color threshold value are set to the same value.

11. An image forming method executed by an image forming apparatus having a document reading unit configured to read a document and outputs image data and is capable of determining whether the document is a color document or a monochrome document, the image forming method comprising the steps of:
    temporarily determining the document as a monochrome document when the ratio of color components of the document is equal to or less than a monochrome threshold value at a specific timing after starting reading the document;
    executing monochrome image processing for a monochrome document on the image data when the document is temporarily determined to be a monochrome document; and
    determining, when the ratio of the color components of the image data becomes equal to or more than the color threshold value while performing the image processing for the monochrome document, the document as a color document and executing color image processing for the color document.

12. The image forming method according to claim 11, wherein:
    the method further comprises a step of executing the monochrome image processing earlier than the reading of the document, and
    the specific timing is a timing at which the monochrome image processing is capable of being completed at the time that reading of the document is completed.

13. The image forming method according to claim 11, wherein:
  determining, when determining the ratio of the color component with respect to the monochrome threshold value, the ratio of color pixels in the image data at the specific timing.

14. The image forming method according to claim 11, wherein:
  determining, when determining the ratio of the color component with respect to the color threshold value, the ratio of color pixels in the image data to the maximum document size of the document.

15. The image forming method according to claim 11, wherein:
  the monochrome threshold value and the color threshold value are set to the same value.

\* \* \* \* \*